(12) United States Patent
Alturaifi et al.

(10) Patent No.: US 11,693,967 B2
(45) Date of Patent: Jul. 4, 2023

(54) MACHINE LEARNING-BASED METHOD AND SYSTEM FOR DETECTING PLAINTEXT PASSWORDS

(71) Applicant: Saudi Arabian Oil Company, Dhahran (SA)

(72) Inventors: Abdullah Abdulaziz Alturaifi, Dhahran (SA); Nada Al-Noaimi, Dhahran (SA); Sireen Abdullah Babateen, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 301 days.

(21) Appl. No.: 16/867,887

(22) Filed: May 6, 2020

(65) Prior Publication Data

US 2021/0350001 A1   Nov. 11, 2021

(51) Int. Cl.
| | |
|---|---|
| *G06F 21/30* | (2013.01) |
| *G06Q 50/30* | (2012.01) |
| *G06F 21/57* | (2013.01) |
| *G06F 16/38* | (2019.01) |
| *G06N 20/00* | (2019.01) |

(Continued)

(52) U.S. Cl.
CPC .............. *G06F 21/57* (2013.01); *G06F 16/38* (2019.01); *G06F 21/602* (2013.01); *G06F 21/6245* (2013.01); *G06N 5/04* (2013.01); *G06N 20/00* (2019.01); *G06F 2221/034* (2013.01)

(58) Field of Classification Search
CPC ........ G06F 21/554; G06F 21/57; G06F 16/38; G06F 21/602; G06F 21/6245; G06F 2221/034; H04L 63/083; H04L 63/1433; H04L 63/1416; G06N 20/00; G06N 5/04
See application file for complete search history.

(56) References Cited

U.S. PATENT DOCUMENTS

| | | |
|---|---|---|
| 8,312,540 B1 | 11/2012 | Kahn et al. |
| 9,386,044 B2 | 7/2016 | Dulkin et al. |

(Continued)

FOREIGN PATENT DOCUMENTS

EP    3131260 A1    2/2017

OTHER PUBLICATIONS

Rathi et al., "A Comparative Analysis of Soft computing techniques for Password Strength Classification," 2020 International Conference on Emerging Trends in Information Technology and Engineering (ic-ETITE) Year: 2020 | Conference Paper | Publisher: IEEE.*

(Continued)

*Primary Examiner* — Roderick Tolentino
(74) *Attorney, Agent, or Firm* — Leason Ellis LLP

(57) ABSTRACT

A technological solution for mitigating a cybersecurity risk on a computer that potentially includes a plaintext password. The solution includes searching a computer resource on the computer, analyzing any text, detecting a string of characters in the text that potentially includes a plaintext password, determining a confidence score for the string of characters indicating a likelihood the string of characters includes the plaintext password, and effectuating a remediation action based on the confidence score, wherein the remediation action includes encrypting the string of characters when the confidence score is equal to or greater than a first certainty level.

20 Claims, 5 Drawing Sheets

(51) Int. Cl.
  *G06F 21/60* (2013.01)
  *G06F 21/62* (2013.01)
  *G06N 5/04* (2023.01)

(56) References Cited

U.S. PATENT DOCUMENTS

| | | | |
|---|---|---|---|
| 10,769,503 B1* | 9/2020 | Buhler | G06V 30/248 |
| 11,429,908 B2* | 8/2022 | Rudden | G06N 3/04 |
| 2006/0041759 A1 | 2/2006 | Kaliski et al. | |
| 2016/0294818 A1* | 10/2016 | Badam | G06F 21/602 |
| 2016/0352769 A1 | 12/2016 | Bryant et al. | |
| 2018/0307857 A1 | 10/2018 | Beecham et al. | |
| 2019/0377880 A1 | 12/2019 | Kolychev et al. | |
| 2020/0050779 A1* | 2/2020 | Prokop | G06F 21/79 |
| 2020/0057864 A1* | 2/2020 | Parthasarathy | G06F 16/24578 |
| 2020/0065476 A1* | 2/2020 | Boutnaru | G06F 21/46 |
| 2020/0342121 A1* | 10/2020 | Wang | H04L 9/14 |
| 2021/0021629 A1* | 1/2021 | Dani | H04L 63/1433 |
| 2021/0279279 A1* | 9/2021 | Appel | G06F 16/9024 |
| 2021/0326438 A1* | 10/2021 | Dichiu | G06N 3/08 |

OTHER PUBLICATIONS

Kaleel et al., "Towards a new Deep Learning Based Approach for the Password Prediction," 2020 IEEE 19th International Conference on Trust, Security and Privacy in Computing and Communications (TrustCom).*
International Search Report and Written Opinion in corresponding application No. PCT/US2021/031011 dated Oct. 15, 2021 (8 pages).
Rallo, Kimberly. "Clear Text Password Risk Assessment Documentation." SANS Technology Institute , Aug. 16, 2001. Accessed Apr. 15, 2020.
"The Importance of Periodic Security Assessment." https://www2.Nil.com/, www2.nil.com/rs/511-FXO-494/images/NIL-Security-Assessments-services.pdf. Accessed Mar. 11, 2020.
"MS-ISAC Security Primer Exposed Credentials." https://www.cisecurity.org/, www.cisecurity.org/wp-content/uploads/2018/04/Security-Primer-Credential-Exposure.pdf. Accessed Mar. 11, 2020.
"Password Plaintext Storage." OWASP, owasp.org/www-community/vulnerabilities/Password_Plaintext_Storage. Accessed Mar. 11, 2020.
"Machine Learning: What it is and Why it Matters." SAS, www.sas.com/en_us/insights/analytics/machine-learning.html. Accessed Mar. 11, 2020.

* cited by examiner

_300_

|  | Y/N | Granted Points |
|---|---|---|
| uppercase letters | n | 0 |
| lowercase letters | y | 1 |
| Numbers | y | 1 |
| text length (minimum 8 characters) | y | 1 |
| special characters | y | 1 |

FIG. 4

MACHINE LEARNING-BASED METHOD AND SYSTEM FOR DETECTING PLAINTEXT PASSWORDS

FIELD OF THE DISCLOSURE

The present disclosure relates to a method, a system and a computer program for detecting a plaintext password on a computer resource asset and effectuating remediation to mitigate a cybersecurity risk to the asset or a computer network to which the computer resource asset connects.

BACKGROUND OF THE DISCLOSURE

The Internet is a worldwide network of interconnected computer networks that use the Transmission Control Protocol/Internet Protocol (TCP/IP) to link communicating devices worldwide. The Internet includes private, public, academic, business, and government networks, all of which are interlinked by arrays of electronic, wireless, wired, or optical networking technologies. The Internet carries a broad range of information resources and services, including the World Wide Web (WWW), electronic mail, telephony, and file sharing. As the Internet evolves and computer networks become increasingly under attack, cybersecurity solutions are taking on ever-greater importance. However, existing cybersecurity solutions have significant shortcomings that are addressed by the cybersecurity solution provided in this disclosure.

SUMMARY OF THE DISCLOSURE

The disclosure provides an effective and reliable technology solution that includes a method, system and computer program for detecting a password on a computer resource asset and effectuating remediation to mitigate a cybersecurity risk to the asset or a computer network to which the computer resource asset connects.

In a non-limiting embodiment, the solution includes a computer-implemented method for mitigating a cybersecurity risk on a computer that potentially includes a plaintext password, wherein the method comprises: searching a computer resource on the computer; analyzing any text in the computer resource; detecting a string of characters in the text that potentially includes a plaintext password; determining a confidence score for the string of characters indicating a likelihood the string of characters includes the plaintext password; and effectuating a remediation action based on the confidence score, wherein the remediation action includes encrypting the string of characters when the confidence score is equal to or greater than a first certainty level.

In the computer-implemented method, the remediation action can include; encrypting the computer resource, including the plaintext password, when the confidence score is equal to or greater than the first certainty level; or, verifying the password when the confidence score is less than the first certainty level but equal to or greater than a second certainty level; or, labeling the string of characters as a false positive when the confidence score is less than a third certainty level.

The computer-implemented method can further comprise labeling the string of characters as a plaintext password.

The computer-implemented method can further comprise updating a parametric value in a machine learning model based on the labeled plaintext password and storing the labeled plaintext password in a database.

The computer-implemented method can further comprise provisionally labeling the string of characters as a potential plaintext password.

The computer-implemented method can further comprise determining whether the provisionally labeled plaintext password includes an actual plaintext password or a false positive.

The computer-implemented method can further comprise labeling the potential plaintext password as a confirmed plaintext password when the provisionally labeled plaintext password is determined to include the actual plaintext password.

In another non-limiting embodiment, the solution comprises a system having a machine learning platform for mitigating a cybersecurity risk on a computer that includes a plaintext password. The system comprises: a plaintext search agent arranged to search a computer resource on the computer and output a string of characters; a plaintext character analyzer arranged to receive and analyze the string of characters; a plaintext password predictor arranged to detect a potential plaintext password in the string of characters and determine a confidence score that indicates a likelihood the string of characters includes a plaintext password; and a remediation unit arranged to effectuate a remediation action based on the confidence score, wherein the remediation action includes encrypting the string of characters when the confidence score is equal to or greater than a first certainty level. The system can comprise an encryption unit arranged to encrypt the computer resource, including the plaintext password, when the confidence score is equal to or greater than the first certainty level.

In yet another non-limiting embodiment, the solution comprises a non-transitory computer readable storage medium containing cybersecurity risk mitigation program instructions for searching and analyzing computer resources in a computer to detect and encrypt a plaintext password, the program instructions, when executed by a processor, causing the processor to perform an operation comprising: searching a computer resource on the computer; analyzing any text in the computer resource; detecting a string of characters in the text that potentially includes a plaintext password; determining a confidence score for the string of characters indicating a likelihood the string of characters includes the plaintext password; and effectuating a remediation action based on the confidence score, wherein the remediation action includes encrypting the string of characters when the confidence score is equal to or greater than a first certainty level.

In the computer readable storage medium, the remediation action can include: encrypting the computer resource, including the plaintext password, when the confidence score is equal to or greater than the first certainty level; or, verifying the password when the confidence score is less than the first certainty level but equal to or greater than a second certainty level; or, labeling the string of characters as a false positive when the confidence score is less than a third certainty level.

In the computer readable storage, the program instructions, when executed by the processor, further causing the processor to perform an operation comprising: labeling the string of characters as a plaintext password; or updating a parametric value in a machine learning model based on the labeled plaintext password; or storing the labeled plaintext password in a database; or provisionally labeling the string of characters as a potential plaintext password; or determining whether the provisionally labeled plaintext password includes an actual plaintext password or a false positive; or labeling the potential plaintext password as a confirmed plaintext password when the provisionally labeled plaintext password is determined to include the actual plaintext password.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 4 shows a non-limiting example of a table that includes the five that can be accounted for when analyzing strings of characters to predict a plaintext password.

Figure 1:
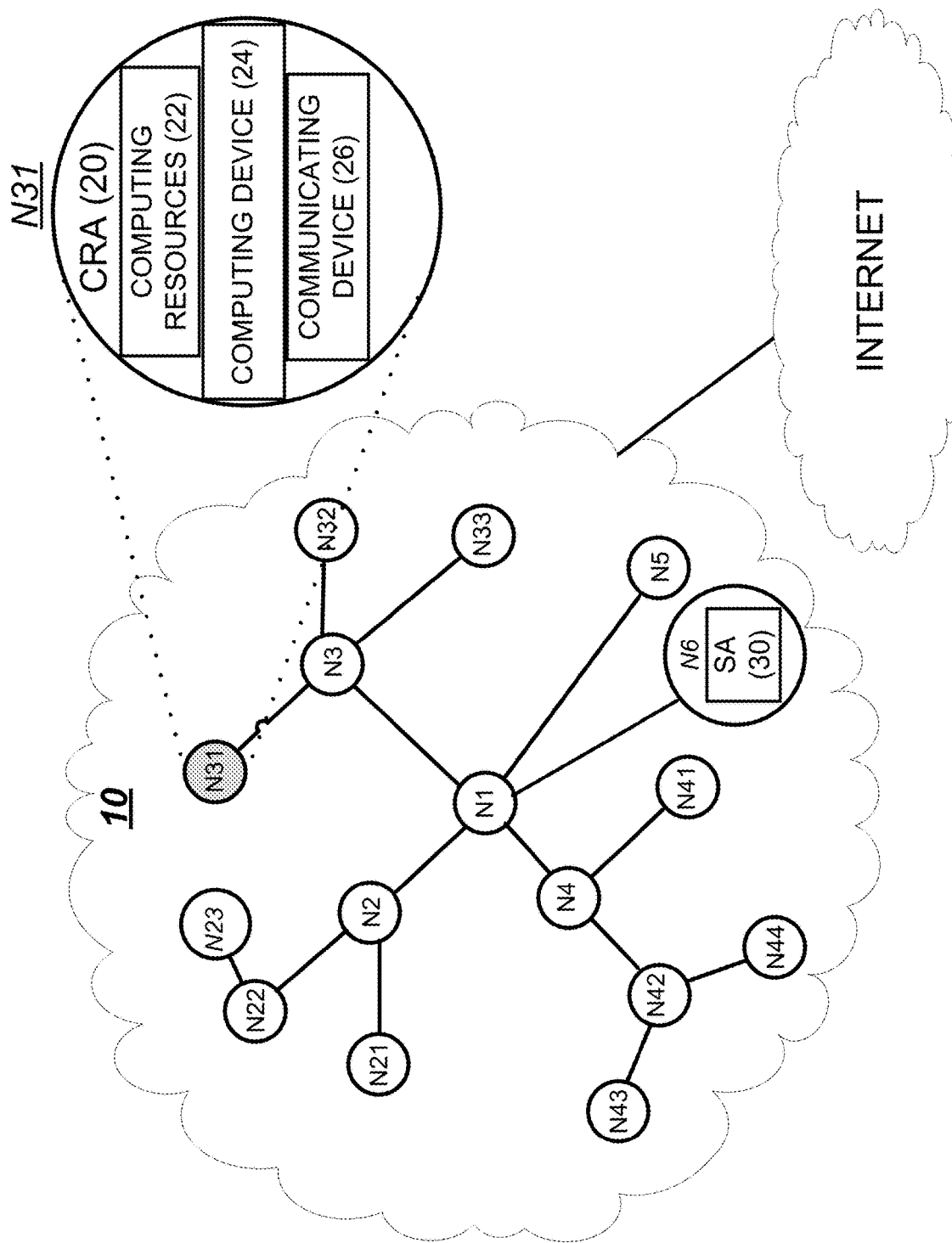
FIG. 1 shows an example of a computer network provided with a non-limiting embodiment of the cybersecurity solution.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Computer network systems are continuously under attack. Often, hackers and cybercriminals are after data on computer networks that they can monetize or use in some way. The attacks are not always direct, but frequently involve attacks made possible through computer resource assets such as end-user client communicating devices or computing devices. The computer resource assets, or their users, may not have any awareness that they are serving as vehicles in attempts by unscrupulous individuals to breach network security and access proprietary information on the computer network systems, or in some way adversely impact or affect the computer network. Numerous computer network systems have recently been breached through end-user computer resource assets, such as, for example, personal laptop computers, smartphones or vendor point-of-sale (PoS) communicating devices that had access to the computer networks.

Computer network systems typically implement security authentication technologies as frontline defenses to thwart cyberattacks. The authentication technologies include, for example, single-factor authentication, multi-factor authentication, layered authentication (or strong authentication), continuous authentication or digital authentication. Regardless of the type of authentication technology, passwords are commonly used as one of the key factors to authenticating a user or computer resource asset before permitting access to a computer network. Passwords are the most popular authentication method, mainly because they are easy to implement, require no special hardware or software, and are familiar to users and developers. Unfortunately, most users store their sensitive information or credentials in plaintext that might be accessible to attackers. Since the information is not encrypted, and stored or transferred in cleartext, the passwords can easily be read or copied. Storing a plaintext password in a computer resource, such as, for example, a configuration file, allows anyone who can read the file access to the password-protected computer resource.

Developers sometimes believe that they cannot defend against unauthorized access to a computer resource from someone who has access to the password for the computer resource. This belief, however, makes an attacker's job easier. Good password management guidelines require that a password must never be stored in plaintext.

A cybersecurity solution is provided that can be readily and easily implemented on a computer resource asset or on a computer network to detect plaintext passwords and effectuate remediation. The solution can be integrated with existing vulnerability scanning tools, such as, for example, those described on the website <https://www.g2.com/categories/vulnerability-scanner>. The cybersecurity solution can effectuate remediation based on a criticality level, which can include prioritizing and remediating computer resource assets on a computer network based on the importance or criticality of the asset to an enterprise or a computer network, including, for example, its infrastructure, security or integrity. The solution can prevent unauthorized users from accessing confidential or proprietary data, modifying or corrupting data, or causing system outages or catastrophic failure.

The solution includes a machine learning platform that can be trained to search text in a computer resource, detect a string of plaintext characters and analyze the string of characters to predict or detect a plaintext password on a computer resource asset. Since plaintext passwords can be stored anywhere on a computer network, including on a computer resource asset, such as, for example, a file (for example, a configuration file), a router, a switch, a computer, a server, a database or source code, the solution can be arranged to target computer resource assets on the network and search those computer resource assets. Alternatively, the solution can be arranged to systematically search all, or less than all computer resource assets on the computer network.

The solution can detect a plaintext password in a character string by analyzing plaintext character strings for common password complexity, such as, for example, including at least one uppercase letter, lowercase letter, number, special character, and text length (for example, minimum of eight characters). The solution can check the similarity of the character string against a database comprising passwords, including, for example, passwords that were previously found or identified by the solution, or passwords that were input or loaded into the database from a list, table, record, file or a computer resource that can input passwords to the database. The solution can predict a level of certainty that a character string includes a password and output a confidence score based on the predicted level of certainty. The solution can categorize the confidence score in any number of prediction certainty levels, including, for example, three levels—high, medium, or low.

The solution can identify an appropriate remediation based on the confidence score or prediction certainty level. The remediation can include, for example, effectuating encryption on the computer resource asset where a confirmed plaintext password is located, effectuating password verification, or classifying and labeling the plaintext character string as a false positive. The solution can ensure security and integrity of a computer resource asset or a computer network system to which the computer resource asset is connected by detecting plaintext passwords and encrypting the computer resource or, alternatively, by extracting the plaintext passwords and replacing them with corresponding ciphertext tokens.

FIG. 1 shows a non-limiting embodiment of a computer network 10 having a plurality of nodes N1, N2, N21, N22, N23, N3, N31, N32, N33, N4, N41, N42, N43, N44, and N5 (collectively or individually referred to as a node "N"). The computer network 10 can include, for example, tens, hundreds, thousands, millions, or more nodes N, any of which can include one or more computing resource assets. Each node N can include a location identifier that can identify the node's physical or virtual address on the computer network 10. The node location identifier can include, for example an Internet Protocol (IP) address, a Media Access Control (MAC) address, an Ethernet Hardware Address (EHA), hardware address, adapter address, physical address, or virtual address. Each node N can include one or more computing resource assets (CRA) 20. Each CRA 20 can include a computer resource 22, a computing device 24 or communicating device 26, for example, as seen for node N31. The cybersecurity solution can search text in one or more computer resources 22 on a target computer resource asset, such as, for example, the CRA 20 located at node N31 on the computer network 10.

The computer network 10 can include an embodiment of the cybersecurity solution, according to the principles of the disclosure. The solution can include a security appliance 30. The security appliance 30 can be located at one or more nodes N on the computer network 10, such as, for example, at node N6. The security appliance 30 can be located outside of the computer network 10, such as, for example, on a cloud network (not shown) or the Internet. The security appliance 30 can include a cybersecurity system 100.

Figure 2:
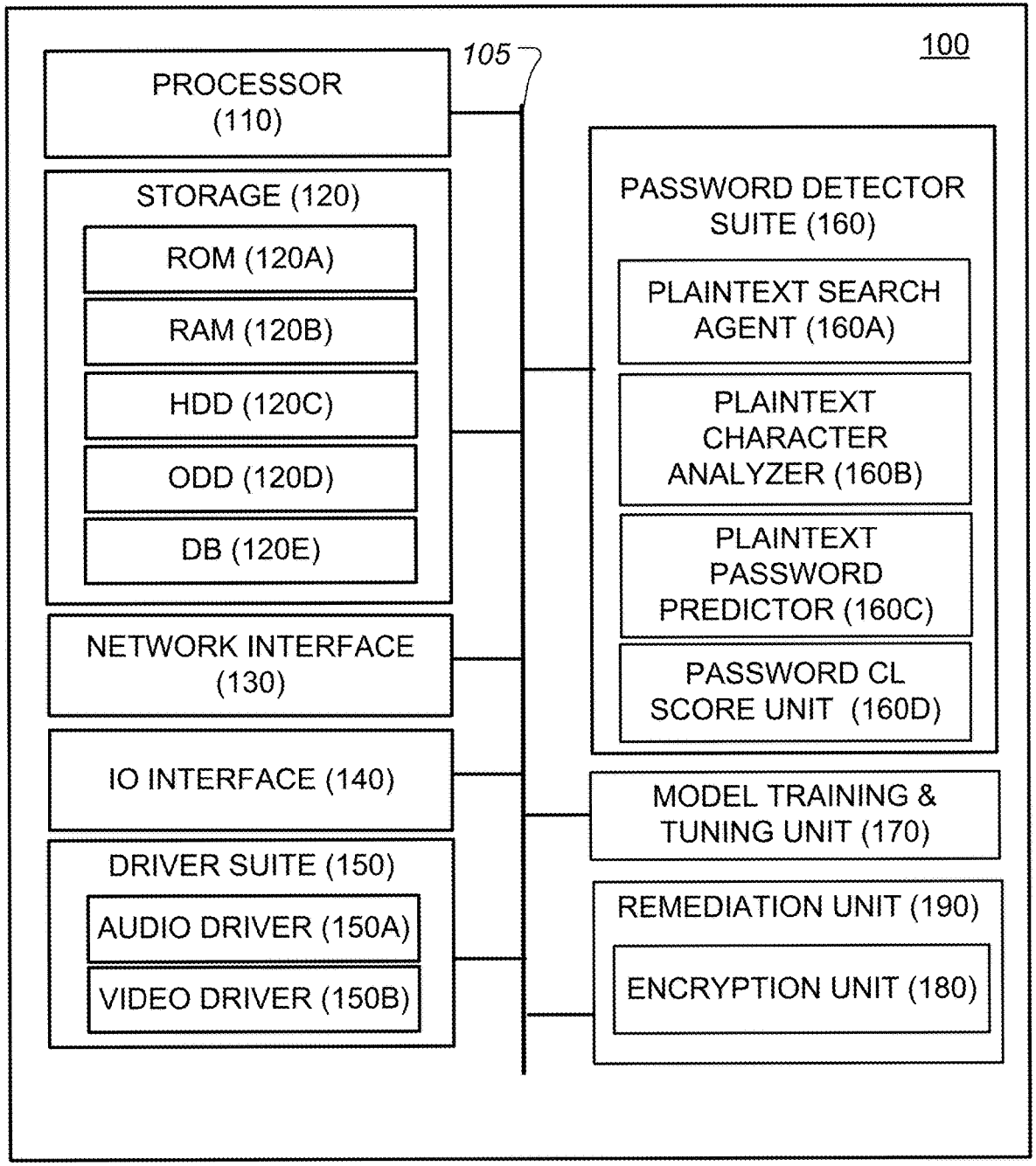
FIG. 2 shows a non-limiting embodiment of the cybersecurity system, constructed according to the principles of the disclosure.

FIG. 2 shows a non-limiting embodiment of the cybersecurity system 100, constructed according to the principles of the disclosure. The system 100 can be configured to implement the various aspects of the solution. The system 100 can include a processor 110, a storage 120, a network interface 130, an input-output (TO) interface 140, a driver suite 150, a password detector suite 160, a model training and tuning (MT&T) unit 170, an encryption unit 180 and a remediation unit 190. The encryption unit 180 can be included in the remediation unit 190, as seen in FIG. 2, or provided as a separate computer resource asset. The system 100 can include a bus 105, which can be connected to any or all of the computer resource assets 110 to 190 by a communication link.

Any one or more of the computer resource assets 120 to 190 can include a computing device that is separate from the processor 110, as seen in FIG. 2, or integrated with the processor 110. Any of the computer assets 120 to 190 can include a computer resource that can be executed on the processor 110 as one or more computing resource processes. The computer resources can be contained in the storage 120.

The bus 105 can include any of several types of bus structures that can further interconnect to a memory bus (with or without a memory controller), a peripheral bus, and a local bus using any of a variety of commercially available bus architectures.

The processor 110 can include any of various commercially available processors. The processor 110 can include a computing device. Dual microprocessors and other multi-processor architectures can be employed as the processor 110. The processor 110 can include a central processing unit (CPU) or a graphic processing unit (GPU). The processor 110 can be arranged to interact with any of the computer resource assets 120 to 190 to carry out or facilitate with the processes in the solution, including a process 200 (shown in FIG. 3).

The storage 120 can include a read-only memory (ROM) 120A, a random access memory (RAM) 120B, a hard disk drive (HDD) 120C, an optical disk drive (ODD) 120D, and a database (DB) 120E. The storage 120 can provide non-volatile storage of data, data structures, and computer-executable instructions, and can accommodate the storage of any data in a suitable digital format.

The storage 120 can include a computer-readable medium that can hold executable or interpretable computer code (or instructions) that, when executed by the processor 110, cause the steps, processes and methods in this disclosure to be carried out. The computer-readable medium can be contained in the HDD 120C or ODD 120D. The computer readable medium can include sections of computer code that, when executed, cause the system 100 to search plaintext on computer resource assets (for example, CRA 20, shown in FIG. 1), detect plaintext passwords, label confirmed plaintext passwords or false positives, update parametric values of a machine learning (ML) model, and encrypt confirmed plaintext passwords or the computer resources containing the confirmed plaintext passwords.

A basic input-output system (BIOS) can be stored in the non-volatile memory 120A, which can include, for example, a ROM, an erasable programmable read-only memory (EPROM), or an electrically erasable programmable read-only memory (EEPROM). The BIOS can contain the basic routines that help to transfer information between any one or more of the computing resource assets 110 to 190 in the system 100, such as during start-up.

The RAM 120B can include dynamic random access memory (DRAM), a synchronous dynamic random access memory (SDRAM), a static random access memory (SRAM), or another high-speed RAM for caching data.

The HDD 120C can include, for example, an enhanced integrated drive electronics (EIDE) drive, a serial advanced technology attachments (SATA) drive, or any suitable hard disk drive for use with big data. The HDD 120C can be configured for external use in a suitable chassis (not shown).

The ODD 120D can be arranged to read or write from or to a compact disk (CD)-ROM disk (not shown), or, read from or write to other high capacity optical media such as a digital versatile disk (DVD).

The HDD 120C or ODD 120D can be connected to the bus 105 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The DB 120E can store training datasets and testing data sets for the ML model used by the machine learning platform to predict or detect plaintext passwords in computer resources. The DB 120E can include a list of known passwords, which can be updated continuously by the machine learning platform.

The DB 120E can store vulnerability records for each node N, computing resource, or computer resource asset on the computer network 10. The vulnerability records can include information for each node N, computing resource, or computer resource asset installed at that node, including, for example, location identifier, node location identifier, platform type, software name, password, date of most recent security scan or analysis, results of security scan or analysis, date of most recent software patch, software patch version, and any other information about the node, computing resource or vulnerability that can be useful in targeting, searching or analyzing the computer resource assets on the computer network 10 for plaintext passwords. The DB 120E can include computing resource installation base data for each computer resource asset on the computer network 10. The DB 120E can include historical data that can be accessed and used build or tune the ML model, including training datasets and testing datasets for the machine learning platform in the system 100.

Any number of computer resources can be stored in the storage 120, including, for example, a program module, an operating system (not shown), one or more application programs (not shown), or program data (not shown). Any (or all) of the operating system, application programs, program modules, and program data can be cached in the RAM 120B as executable sections of computer code.

The network interface 130 can be connected to the network 10 or the Internet (shown in FIG. 1). The network interface 130 can include a wired or a wireless communication network interface (not shown) or a modem (not shown). When used in a local area network (LAN), the system 100 can be connected to the LAN network through the wired or wireless communication network interface; and, when used in a wide area network (WAN), the system 100 can be connected to the WAN network through the modem. The computer network 10 (shown in FIG. 1) can include a LAN, a WAN, or any other network. The modem (not shown) can be internal or external and wired or wireless. The modem can be connected to the system bus 105 via, for example, a serial port interface (not shown). The network interface 130 can include a receiver (not shown), transmitter (not shown) or transceiver (not shown).

The input-output (TO) interface 140 can receive commands or data from an operator via a user interface (not shown), such as, for example, a keyboard (not shown), a mouse (not shown), a pointer (not shown), a stylus (not shown), a microphone (not shown), a speaker (not shown), or a display device (not shown). The received commands and data can be forwarded from the IO interface 140 as instruction to data signals, via the bus 105, to any of the computer resource assets 110 to 190 in the system 100.

The driver suite 150 can include an audio driver 150A and a video driver 150B. The audio driver 150A can include a sound card, a sound driver (not shown), an interactive voice response (IVR) unit, or any other device necessary to render a sound signal on a sound production device (not shown), such as for example, a speaker (not shown). The video driver 150B can include a video card (not shown), a graphics driver (not shown), a video adaptor (not shown), or any other device necessary to render an image signal on a display device (not shown).

The password detector suite 160 can include one or more machine learning platforms, including one or more supervised machine learning platforms or one or more unsupervised machine learning platforms. The machine learning platform can include, for example, a Word2vec deep neural network, a convolutional architecture for fast feature embedding (CAFFE), an artificial immune system (AIS), an artificial neural network (ANN), a convolutional neural network (CNN), a deep convolutional neural network (DCNN), region-based convolutional neural network (R-CNN), you-only-look-once (YOLO), a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, logistic model tree induction (LMT), NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning for searching or analyzing plaintext and detecting or predicting plaintext passwords in strings of plaintext characters. The machine learning platform(s) can include the ML model, which can search, analyze and detect or predict plaintext passwords in the CRA 20 (shown in FIG. 1).

The ML model can be arranged to receive plaintext as input, including a string of characters, extract features from the plaintext, classify the extracted features, cluster or group results and predict a plaintext password in the string of characters based on an analysis of the plaintext. The ML model can be built, trained or tuned by the MT&T unit 170. The MT&T unit 170 can train the ML model using annotated historical data, including the training dataset stored in the DB 120E, and tune the ML model using the testing dataset stored in the DB 120E. The MT&T unit 170 can tune the ML model during operation of the system 100 by updating parametric values in the ML model based on, for example, outputs from a plaintext password remediation process 200 (shown in FIGS. 3A and 3B).

The password detector suite 160 can include one or more computing resource assets, including a plaintext search agent 160A, a plaintext character analyzer 160B, a plaintext password predictor 160C, and a password certainty-level (CL) score unit 160D. Any one or more of the computing resource assets, including 160A, 160B, 160C or 160D, can include a machine learning platform. In a non-limiting embodiment of the system 100, the password detector suite 160 is constructed as a machine learning platform, in which a plurality of neural network layers are constructed to operate as the plaintext search agent 160A, plaintext character analyzer 160B, plaintext password predictor 160C, or password CL score unit 160D.

The plaintext search agent 160A can be arranged to interact with, for example, the processor 110, storage 120 or network interface 140, to traverse computer resource assets on the computer network 10 (shown in FIG. 1). The plaintext search agent 160A can be arranged to traverse computer resources 22 (such as, for example, configuration files) on the CRA 20 (shown in FIG. 1) and search for plaintext. The plaintext search agent 160A can include a crawler, spider or bot. The plaintext search agent 160A can be arranged to index strings of characters, or to copy, deconstruct or extract strings of characters comprising plaintext from the computer resource 22 and input the plaintext character strings to the plaintext character analyzer 160B. The plaintext search agent 160A can be arranged to interact with the storage 120 to store plaintext characters in, for example, the DB 120E (shown in FIG. 1). The DB 120E can store metadata corresponding to the computer resource 22 from which the plaintext character strings were copied, deconstructed or extracted, including, for example, location of the plaintext character string in the computer resource 22 and time of copying, deconstruction or extraction.

In a non-limiting embodiment, the plaintext search agent 160A can be arranged to receive as input a list of plaintext passwords from the DB 120E or an external source (not shown), and search text on each computer resource 22 on the CRA 20 (shown in FIG. 1) to find a matching plaintext password for any or more of the passwords on the input list.

The plaintext search agent 160A can be arranged to preprocess strings of plaintext characters. The preprocessing can include tokenization or another technique to eliminate unconcerned differences, such as, for example, non-password text such as common use words. The preprocessing can include sizing and normalization of the plaintext character strings. The plaintext search agent 160A can be arranged to input the plaintext character strings to the plaintext character analyzer 160B.

In an alternative embodiment, the plaintext character analyzer 160B can be arranged to preprocess the strings of plaintext characters.

The plaintext character analyzer 160B can be arranged to analyze each string of characters, including each character in a plaintext character string, and classify each character or the plaintext character string. The plaintext analyzer 160B can include feature extraction and vector classification. The plaintext analyzer 160B can be arranged to extract features from the strings of characters based on, for example, the factors included in table 300 (shown in FIG. 4). The plaintext analyzer 160B can output a classification for each character or plaintext character string to the plaintext password predictor 160C. The plaintext analyzer 160B can be arranged to annotate each string of characters that is determined to include a plaintext password with a label. The plaintext analyzer 160B can interact with the MT&T unit 170 and output confirmed plaintext passwords with corresponding labels, as well as classification data, to the MT&T unit 170, which in turn can be used by the MT&T unit 170 to build or update the training dataset or testing dataset.

The plaintext character analyzer 160B can be arranged to analyze each character in a plaintext character string according a plurality of factors to determine whether the character includes, for example, an uppercase letter, a lowercase letter, a number, or a special character. The total number of characters in the plaintext character string can be counted. The factors can include, for example, the factors in table 300 (shown in FIG. 4).

In a non-limiting embodiment, the plaintext character analyzer 160B includes a CNN or DCNN, in which case, the plaintext character analyzer 160B can format the plaintext character strings into matrices and filter each matrix using at least one convolution filter by sliding the convolution filter across (for example, as a function of time) each matrix to compute dot products and detect patterns. The plaintext character analyzer 160B can slide and apply multiple convolution filters across multiple matrices of plaintext character data to extract a plurality of feature maps for the plaintext character data. Once the feature maps are extracted, the feature maps can be moved to one or more rectified linear unit layers (ReLUs) in the neural network to locate the features. After the features are located, the rectified feature maps can be moved to one or more pooling layers to down-sample and reduce the dimensionality of each feature map. The down-sampled data can be output as a one-dimensional data array or multidimensional data arrays from the pooling layers and flattened (or converted) into single continuous linear vectors that can be forwarded to the fully connected layer. The flattened matrices from the pooling layer can be fed as inputs to a fully connected neural network layer, such as, which can auto-encode the feature data from the feature extraction and classify the character data. The plaintext character analyzer 160B can include a fully connected layer that contains a plurality of hidden layers and an output layer. The output layer can output character classification data to the plaintext password predictor 160C.

The plaintext password predictor 160C can be arranged to receive the output form the plaintext character analyzer 160B, including character classification data and predict a probability that a plaintext character string includes a plaintext password. The plaintext password predictor 160C can generate a confidence score for character or plaintext character string, including the likelihood that a bounding box includes a plaintext password or a plaintext password character. The plaintext password predictor 160C can interact with the plaintext character analyzer 160B and perform bounding box classification, refinement or scoring based on the characters in the plaintext character string. The confidence score can have a value ranging from, for example, 0 to 5, 0 to 10, or 0% to 100%, with 100% being a confirmed plaintext password and 0% being confirmed non-password plaintext.

The confidence score can be output by the plaintext password predictor 160C to the password certainty-level (CL) score unit 160D. The password CL score unit 160D can categorize the analyzed plaintext character string into one of three certainty levels, for example, a high certainty level, a medium certainty level or a low certainty level. The plaintext character string can be classified into more, or less than three certainty levels. In a non-limiting example, the high certainty level includes plaintext character strings for which the confidence score value is greater than or equal to 70% (up to 100%); the medium certainty level includes plaintext character strings for which the confidence score value is greater than or equal to 30% but less than 70%; and, the low level includes plaintext character strings for which the confidence score value is less than 30%.

In the password detector suite 160, the plaintext character analyzer 160B, plaintext password predictor 160C and password CL score unit 160D can be implemented in a non-limiting embodiment using one or more CNNs having a number of convolutional/pooling layers (for example, 1 or 2 convolutional/pooling layers) and a single fully connected layer, or it can be implemented using a DCNN having many convolutional/pooling layers (for example, 10 or more layers) followed by multiple fully connected layers (for example, two or more fully connected layers). The password detector suite 160 can be arranged to develop or operate the ML model based on both input and output data (supervised learning model) or group and interpret data based only on input data (unsupervised learning model).

Figure 3A:
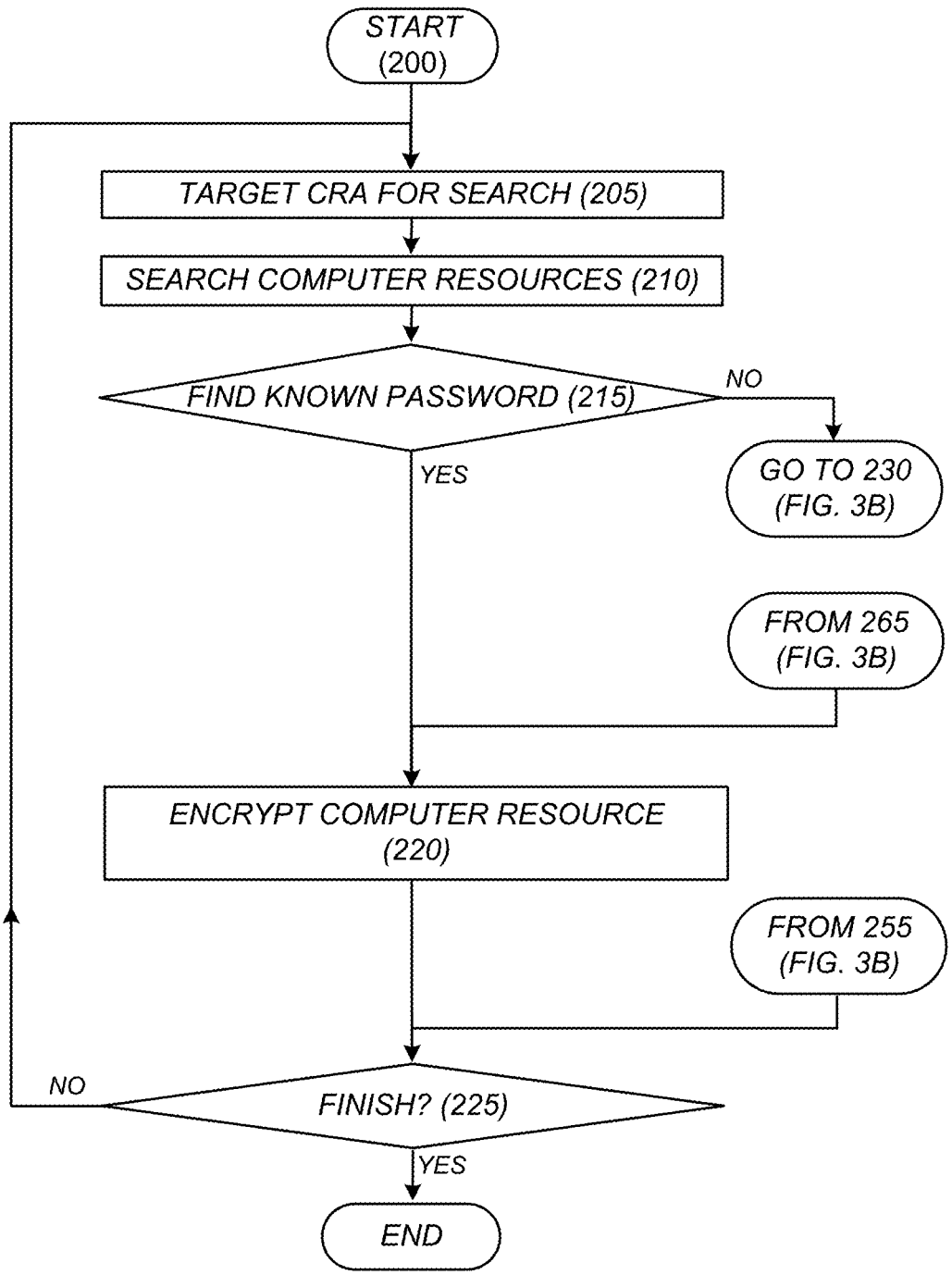
FIGS. 3A and 3B show a non-limiting embodiment of a plaintext password remediation process, according to the principles of the disclosure.
Figure 3B:
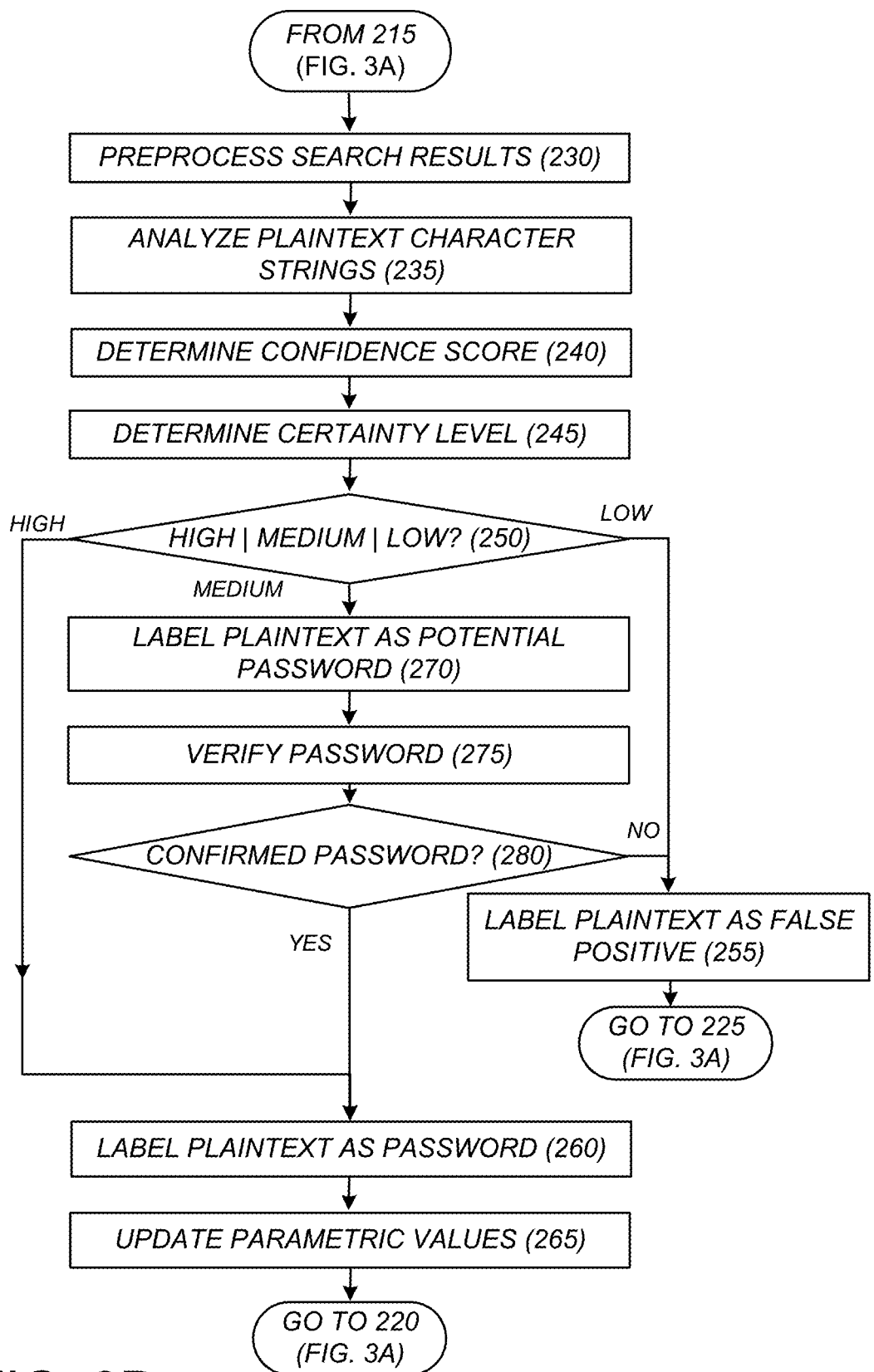

The MT&T unit 170 can be arranged to interact with the password detector suite 160, train the ML model using the training dataset, and tune the ML model using the testing dataset or outputs from the process 200 (shown in FIGS. 3A and 3B). The MT&T unit 170 can be arranged to interact with an operator via, for example, the IO interface 140 and receive annotations or instructions from the operator to build or update the training dataset. The ML model can be tested using the testing dataset, and the results can be feedback to tune the parametric values in the ML model. Once the ML model is trained, the MT&T unit 170 can be arranged to continuously tune the ML model by updating the parametric values in the ML model based on the outputs from the process 200 (shown in FIGS. 3A and 3B).

The encryption unit 180 can be arranged to convert a plaintext password into a corresponding ciphertext toke or to convert all (or less than all) plaintext in the computer resource containing the plaintext password into ciphertext. In a non-limiting example, the encryption unit 180 can encrypt all plaintext in a configuration file into ciphertext. The encryption unit 180 can include one or more encryption or hashing algorithms. The encryption unit 180 can include, for example, a password-based key derivation function (for example, PBKDF1, PBKDF2 or scrypt), a password hashing function (for example, bcrypt), or any encoding technique that can protect and defend against attempts or attacks (for example, brute-force attacks) to decrypt or decode the plaintext password from the ciphertext.

As seen in FIG. 2, the encryption unit 180 can be included in the remediation unit 190. The remediation unit 190 can be arranged to identify an appropriate remediation action based on the confidence score or certainty level. The remediation can include effectuating the encryption unit 180 to encrypt the computer resource (or CRA 20) containing the plaintext password. The remediation can include password verification, which can include, for example, initiating a password verification session with a computer resource asset at an operator location and receiving confirmation instructions or data from the operator via the computer resource asset. The remediation can include classifying the plaintext character string as a false positive. When the character string is determined to include a plaintext password, the remediation can include: annotating the character string with a label that indicates the character string includes a confirmed password; interacting with the MT&T unit 170 to update the parametric values in the ML model; interacting with the MT&T unit 170 or DB 120E to update the training or testing datasets.

FIGS. 3A and 3B show a non-limiting embodiment of the plaintext password remediation process 200, according to the principles of the disclosure. The process 200 can be carried out by the system 100 (shown in FIG. 2). The process 200 can begin by identifying the target CRA 20 (shown in FIG. 1) on the computer network 10 (Step 205) and searching one or more computer resources 22 on the CRA 20 (Step 210). All computer resources 22 that contain text can be searched by the plaintext search agent 160A (shown in FIG. 2).

In order to facilitate an understanding of the process 200, the following description is directed to a non-limiting example in which the computer resource 22 to be searched is a configuration file and the CRA 20 is an end user computer connected to the computer network, with the understanding that any other computer resources, including documents or files, or computer resource assets can be targeted or searched for plaintext passwords.

The configuration file on the end user computer can be searched by the plaintext search agent 160A (show in FIG. 2) in any of a number of ways, as will be understood by those skilled in the art. For instance, a list of known plaintext passwords can be retrieved from the DB 120E (shown in FIG. 2) and, beginning with, for example, a first plaintext password entry on the list, each password on the list can be compared to all the text in the configuration file to determine whether the configuration file includes a matching plaintext password.

Alternatively, the text in the configuration file can be filtered by the plaintext search agent 160A to remove or ignore all plaintext that is highly likely (for example, greater than 99.99%) not to contain plaintext passwords, such as, for example, common usage words like "the," "and," "from," "to," among others. The plaintext that remains after filtering can then be compared against each of the passwords on the list; or, the passwords on the list can be compared against the plaintext in the configuration file.

After the plaintext search agent 160A finishes searching the text in the configuration file (Step 210), a determination can be made whether the configuration file contains a known password (Step 215). The determination can be made by the plaintext search agent 160A by comparing list of known passwords against the text in the configuration file while searching the text; or, the determination can be made by the plaintext character analyzer 160B after analyzing strings of characters in the text. If a known password is found in the configuration file, such as a password on the list (YES at Step 215), then a trigger signal can be sent to the remediation unit 190 and the configuration file can be encrypted (Step 220).

In an alternative embodiment, the plaintext password detector suite 160 can interact with the remediation unit 190 to detect and extract the plaintext password in the configuration file and replace it with the corresponding ciphertext token (Step 220). The cipertext token can include an encryption of the plaintext password by the encryption unit 180 (shown in FIG. 2) using an encryption algorithm, such as, for example, the password-based key derivation function (for example, PBKDF1, PBKDF2 or scrypt), a password hashing function (for example, bcrypt), or any encoding technique that can protect and defend against attempts or attacks (for example, brute-force attacks) to decrypt or decode the plaintext password from the ciphertext token.

Upon completing encryption of the plaintext in the configuration file (Step 220), a determination can be made by the password detector suite 160 whether to search another computer resource on the same end user computer or to search another computer on the computer network (Step 225). If it is determined that another computer resource or computer should be searched (YES at Step 225), then the process 200 can be repeated with another computer resource on the same computer or a different end user, otherwise the process 200 can end (NO at Step 225).

If, however, after finishing searching the text in the configuration file a determination is made that the configuration file does not contain any known password (NO at Step 215), then the text in the configuration file can be, optionally, preprocessed (Step 230). The preprocessing can include eliminating unconcerned differences, such as, for example, non-password text such as common use words, or sizing and normalization of the plaintext character strings in the configuration file. The preprocessing can include parsing the plaintext in the configuration file into strings of plaintext characters. The preprocessing can be performed by either the plaintext search agent 160A or plaintext character analyzer 160B.

The plaintext character strings in the configuration file can be analyzed by the plaintext character analyzer 160B (Step 235) and a confidence score determined by the plaintext password predictor 160C for each string of plaintext characters in the configuration file (Step 240). In analyzing the text in the configuration file, a string of characters, including the position of each character and its relationship to all other characters in the string, can be analyzed to extract features that can be used to recognize and classify patterns. The plaintext characters can include characters from any known alphabet (for example, Arabic, Aramaic, Armenian, Brahmi, Cyrillic, Georgian, Greek, or Latin) or any known symbols (for example, braille, mathematics, or scientific). In a non-limiting example, the plaintext analyzer 160B (or ML model) can be trained to look for character strings that have (i) at least one uppercase letter, (ii) at least one lowercase letter, (iii) at least one number, (iv) at least one special character, and (v) a total length of at least eight (8) characters, and apply a weight (for example, "0" or "1") for each factor (i) to (v) in predicting a likelihood that a character string contains a plaintext password.

FIG. 4 shows a non-limiting example of a table 300 that includes the five factors (i) to (v) that can be accounted for when analyzing the strings of characters in the plaintext character analyzer 160B using the ML model to predict a plaintext password. In this example, the table 300 can include a factor (vi) for the total number of characters in the string and whether the total number exceeds a maximum character length (for example, 24 characters).

While the example shown in FIG. 4 includes five factors with binary weights "0" or "1" applied for each factor that is satisfied, any number of factors, including more or less than five factors, can be utilized in the analysis. Similarly, each weight can have any range of values, including for example, 0 to 100, which can be based on a predicted likelihood that the factor is satisfied.

Referring to the non-limiting example in table 300, when a character string having the value "js7ada#@8d" is found in the configuration file, the plaintext character analyzer 160B can parse and analyze each character, as well as the group characters as a whole (Step 235) and determine that the string of characters meets factors (ii) to (v), but does not meet factor (i) in the table. That is, the analyzed character string (i) does not include any uppercase letters ("n"), but does include (ii) at least one lowercase letter ("y"), (iii) at least one number ("y"), (iv) at least one special character ("y"), and, (v) at least 8 characters in total ("y"). Having learned previously that plaintext passwords included all five factors (i) to (v), the analysis can apply a weight of "0" for factor (i) and a weight of "1" for each of the other factors (ii) to (v), and determine a confidence score of 4 out of at total 5 (or 80%) likelihood that the plaintext character string js7ada#@8d includes a plaintext password.

A certainty level can be determined byte password CL score unit 160D (shown in FIG. 2) for the character string having a predicted plaintext password based on the confidence score, thereby determining the level of certainty that that character string likely includes the plaintext password (Step 245). In the non-limiting example above, the password CL score unit 160D can be arranged to determine a certainty level having any one of three values—that is, a high, medium or low certainty level. As mentioned above, the high certainty level includes plaintext character strings for which the confidence score value is greater than or equal to 70% (up to 100%); the medium certainty level includes plaintext character strings for which the confidence score value is greater than or equal to 30% but less than 70%; and, the low level includes plaintext character strings for which the confidence score value is less than 30%.

If the certainty level is determined to be low (LOW at Step 250), then that character string can be labeled by the password CL score unit 160D as a false positive (Step 255) and a determination made whether to end the process 200 (Step 225).

If the certainty level is determined to be high (HIGH at Step 250), then the plaintext character string can be labeled by the password CL score unit 160D as a plaintext password (Step 260), and the password CL score unit 160D can interact with the MT&T unit 170 (shown in FIG. 2) to update the parametric values in the ML model (Step 265) and the remediation unit 190 (shown in FIG. 2) to encrypt the configuration file, including the plaintext password (Step 220).

If the certainty level is determined to be medium (MEDIUM at Step 250), then the password CD score unit 160D can provisionally label the character string as a potential plaintext password (Step 270) and perform password verification of the character string (Step 275). The password verification can be performed automatically or through interaction with a human operator (not shown). In this regard, the password CL score unit 160D can interact with the remediation unit 190 (shown in FIG. 2) and trigger communication with the human operator via the IO interface 140 or driver suite 150. The remediation unit 190 can communicate the character string to the operator, for example, for display on a display device (not shown), and receive a confirmation entry from the operator, such as, for example, a confirmation that the character string includes a plaintext password, a confirmation that the character string includes a false positive, or an annotation such as a label for the character string, which can be used by the MT&T unit 170 to update the ML model or training dataset stored in the DB 120E (shown in FIG. 2). The remediation unit 190 can be arranged to forward the confirmation entry to the password CL score unit 160D.

If the received confirmation entry includes a confirmation that the character string includes a plaintext password (YES at Step 280), then the password CL score unit 160D can convert the provisional label to a label that confirms the character string includes a plaintext password (Step 260) and the ML model can be updated by the MT&T unit 170 with the label and plaintext character string (Step 265).

If the received confirmation entry includes a confirmed false positive (NO at Step 280), then the provisional label is converted by the password CL score unit 160D to a confirmed false positive (Step 255).

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (µC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more computing resource processes.

The term "computing resource process," as used in this disclosure, means a computing resource that is in execution or in a state of being executed on an operating system of a computing device. Every computing resource that is created, opened or executed on or by the operating system can create a corresponding "computing resource process." A "computing resource process" can include one or more threads, as will be understood by those skilled in the art.

The terms "computer resource asset" or "computing resource asset," as used in this disclosure, means a computing resource, a computing device or a communicating device, or any combination thereof.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "node," as used in this disclosure, means a physical or virtual location in a computer network that comprises at least one computer resource asset.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The term "transmission" or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for mitigating a cybersecurity risk on a target computer resource asset that potentially includes a plaintext password, the method comprising:
    identifying the target computer resource asset on a computer network;
    searching a computer resource on the identified computer resource asset;
    preprocessing any text in the computer resource using a plaintext character analyzer including a convolutional neural network (CNN) having a plurality of layers to generate a string of plaintext characters;
    analyzing the string of plaintext characters;
    determining a confidence score for the string of plaintext characters indicating a likelihood the string of plaintext characters includes a plaintext password; and
    effectuating a remediation action based on the confidence score,
    wherein the remediation action includes encrypting the string of plaintext characters when the confidence score is equal to or greater than a first certainty level.

2. The computer-implemented method in claim 1, wherein the remediation action includes encrypting the computer resource, including the plaintext password, when the confidence score is equal to or greater than the first certainty level.

3. The computer-implemented method in claim 1, wherein the remediation action includes password verification when the confidence score is less than the first certainty level but equal to or greater than a second certainty level.

4. The computer-implemented method in claim 1, wherein the remediation action includes labeling the string of plaintext characters as a false positive when the confidence score is less than a third certainty level.

5. The computer-implemented method in claim 2, further comprising:
    labeling the string of plaintext characters as a plaintext password.

6. The computer-implemented method in claim 5, further comprising:
    updating a parametric value in a machine learning model based on the labeled plaintext password; and
    storing the labeled plaintext password in a database.

7. The computer-implemented method in claim 3, further comprising:
    provisionally labeling the string of plaintext characters as a potential plaintext password.

8. The computer-implemented method in claim 7, further comprising:
    determining whether the provisionally labeled plaintext password includes an actual plaintext password or a false positive.

9. The computer-implemented method in claim 8, further comprising:
    labeling the potential plaintext password as a confirmed plaintext password when the provisionally labeled plaintext password is determined to include the actual plaintext password.

10. A system having a machine learning platform for mitigating a cybersecurity risk on a target computer resource asset that includes a plaintext password, the system comprising:
    a processor and a memory, for implementing:
    a target computer resource asset identifying agent arranged to identify the target computer resource asset on a computer network;
    a plaintext search agent arranged to search text in a configuration file of a computer resource on the target computer resource asset;
    a plaintext character analyzer including a convolutional neural network (CNN) having a plurality of layers arranged to receive, preprocess, and analyze the in the configuration file to generate a string of plaintext characters;

a plaintext password predictor arranged to detect a potential plaintext password in the string of plaintext characters and determine a confidence score that indicates a likelihood the string of plaintext characters includes a plaintext password; and a remediation unit arranged to effectuate a remediation action based on the confidence score, wherein the remediation action includes encrypting the string of plaintext characters when the confidence score is equal to or greater than a first certainty level.

11. The system in claim 10, further comprising an encryption unit that is arranged to encrypt the computer resource, including the plaintext password, when the confidence score is equal to or greater than the first certainty level.

12. A non-transitory computer readable storage medium containing cybersecurity risk mitigation program instructions for searching and analyzing computer resources in a target computer resource asset to detect and encrypt a plaintext password, the program instructions, when executed by a processor, causing the processor to perform an operation comprising:

identifying the target computer resource asset on a computer network;

searching a computer resource on the target computer resource asset;

preprocessing any text in the computer resource using a plaintext character analyzer including a convolutional neural network (CNN) having a plurality of layers to generate a string of plaintext characters;

analyzing any text in the computer resource;

determining a confidence score for the string of plaintext characters indicating a likelihood the string of plaintext characters includes a plaintext password; and effectuating a remediation action based on the confidence score, wherein the remediation action includes encrypting the string of plaintext characters when the confidence score is equal to or greater than a first certainty level.

13. The computer readable storage medium in claim 12, wherein the remediation action includes encrypting the computer resource, including the plaintext password, when the confidence score is equal to or greater than the first certainty level.

14. The computer readable storage medium in claim 12, wherein the remediation action includes password verification when the confidence score is less than the first certainty level but equal to or greater than a second certainty level.

15. The computer readable storage medium in claim 12, wherein the remediation action includes labeling the string of plaintext characters as a false positive when the confidence score is less than a third certainty level.

16. The computer readable storage medium in claim 13, the program instructions, when executed by the processor, further causing the processor to perform an operation comprising:

labeling the string of plaintext characters as a plaintext password.

17. The computer readable storage medium in claim 16, the program instructions, when executed by the processor, further causing the processor to perform an operation comprising:

updating a parametric value in a machine learning model based on the labeled plaintext password; and storing the labeled plaintext password in a database.

18. The computer readable storage medium in claim 14, the program instructions, when executed by the processor, further causing the processor to perform an operation comprising:

provisionally labeling the string of plaintext characters as a potential plaintext password.

19. The computer readable storage medium in claim 18, the program instructions, when executed by the processor, further causing the processor to perform an operation comprising:

determining whether the provisionally labeled plaintext password includes an actual plaintext password or a false positive.

20. The computer readable storage medium in claim 19, the program instructions, when executed by the processor, further causing the processor to perform an operation comprising:

labeling the potential plaintext password as a confirmed plaintext password when the provisionally labeled plaintext password is determined to include the actual plaintext password.

* * * * *

UNITED STATES PATENT AND TRADEMARK OFFICE
CERTIFICATE OF CORRECTION

PATENT NO. : 11,693,967 B2  
APPLICATION NO. : 16/867887  
DATED : July 4, 2023  
INVENTOR(S) : Abdullah Abdulaziz Alturaifi, Nada Al-Noaimi and Sireen Abdullah Babateen Page 1 of 1

It is certified that error appears in the above-identified patent and that said Letters Patent is hereby corrected as shown below:

In the Claims

Column 18, Line 52-Column 19, Line 10 should read:
--10. A system having a machine learning platform for mitigating a cybersecurity risk on a target computer resource asset that includes a plaintext password, the system comprising: a processor and a memory, for implementing: a target computer resource asset identifying agent arranged to identify the target computer resource asset on a computer network; a plaintext search agent arranged to search text in a configuration file of a computer resource on the target computer resource asset; a plaintext character analyzer including a convolutional neural network (CNN) having a plurality of layers arranged to receive, preprocess, and analyze the text in the configuration file to generate a string of plaintext characters; a plaintext password predictor arranged to detect a potential plaintext password in the string of plaintext characters and determine a confidence score that indicates a likelihood the string of plaintext characters includes a plaintext password; and a remediation unit arranged to effectuate a remediation action based on the confidence score, wherein the remediation action includes encrypting the string of plaintext characters when the confidence score is equal to or greater than a first certainty level.--

Signed and Sealed this  
Eighth Day of August, 2023

Katherine Kelly Vidal  
*Director of the United States Patent and Trademark Office*